US012659145B2

(12) United States Patent
Stapleton et al.

(10) Patent No.: US 12,659,145 B2
(45) Date of Patent: Jun. 16, 2026

(54) DERIVED UNIQUE KEY FOR PRE-SHARED KEY (DUK-PSK)

(71) Applicant: Wells Fargo Bank, N.A., San Francisco, CA (US)

(72) Inventors: Jeffrey J. Stapleton, O'Fallon, MO (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/799,815

(22) Filed: Aug. 9, 2024

(65) Prior Publication Data
US 2026/0046121 A1 Feb. 12, 2026

(51) Int. Cl.
*H04L 9/08* (2006.01)
*H04L 9/40* (2022.01)

(52) U.S. Cl.
CPC .......... *H04L 9/0861* (2013.01); *H04L 63/062* (2013.01)

(58) Field of Classification Search
CPC .................................................... H04L 9/0861
See application file for complete search history.

(56) References Cited

U.S. PATENT DOCUMENTS

| | | | | | |
|---|---|---|---|---|---|
| 5,336,870 | A | * | 8/1994 | Hughes .................... | G07F 17/26 |
| | | | | | 902/24 |
| 5,745,576 | A | * | 4/1998 | Abraham .............. | H04L 9/0847 |
| | | | | | 705/73 |

| | | | | | |
|---|---|---|---|---|---|
| 10,326,803 | B1 | * | 6/2019 | Haney ..................... | H04L 63/30 |
| 10,757,573 | B2 | * | 8/2020 | Guertler .............. | H04W 12/043 |
| 12,256,013 | B2 | * | 3/2025 | Rule ..................... | H04L 9/0861 |
| 2009/0158032 | A1 | * | 6/2009 | Costa .................. | H04L 63/0823 |
| | | | | | 380/270 |
| 2010/0121701 | A1 | * | 5/2010 | Nguyen ............. | G06Q 30/0238 |
| | | | | | 705/17 |
| 2018/0167751 | A1 | * | 6/2018 | Vendelbo .............. | H04R 25/70 |
| 2025/0350454 | A1 | * | 11/2025 | Kolekar ............... | H04L 9/0894 |

OTHER PUBLICATIONS

"The EAP-PSK Protocol: A Pre-Shared Key Extensible Authentication Protocol (EAP) Method"; F. Bersani, H. Tschofenig ; France Telecom R&D Category:; Siemens Networks GmbH & Co KG; Jan. 2007 pp. 1-64.*

* cited by examiner

*Primary Examiner* — Mohammad A Siddiqi
(74) *Attorney, Agent, or Firm* — Foley & Lardner LLP

(57) ABSTRACT

The arrangements disclosed herein relate to systems, apparatus, methods, and non-transitory computer readable media for receiving, by a client from a terminal, an External Pre-Shared Key (EPKS) package comprising a transaction key, wherein the transaction key is derived by the terminal using an Initial Key (IK) and a counter, sending, by the client to a server, a first message comprising the TID and the counter, receiving, by the client from the server, a second message in response to the first message, determining, by the client, a session key using the EPKS package, and communicating by the client with the server via a communication session using the session key.

17 Claims, 4 Drawing Sheets

400

Terminal 102

Client 104

440

Receive EPKS(TK) from terminal

410

Receive TID and IK from KIF

450

Send to server TID, counter, and TK(Test)

420

Derive TK using IK and counter

460

Receive response from server

430

Provide EPKS(TK) and counter to Client

470

Determine session key using EPKS package

480

Communicate with server via communication session using session key

DERIVED UNIQUE KEY FOR PRE-SHARED KEY (DUK-PSK)

BACKGROUND

Cryptographic transitions from one algorithm to another, or even from one key length to another, have always been problematic. The inevitable cryptanalysis by a Crypto-graphically Relevant Quantum Computer (CRQC) poses a worldwide threat. In addition, multiple Post Quantum Cryptography (PQC) transitions pose enormous challenges to long-established cryptographic frame works. For example, transitioning legacy asymmetric key management or signature algorithms such as Rivest-Shamir-Adleman (RSA), Diffie-Hellman, Elliptic Curve Cryptography (ECC) to PQC can be problematic, complex, difficult, time-consuming, and costly, as public key cryptography is currently deployed in many applications, protocols, products, and locations world-wide.

SUMMARY

The arrangements disclosed herein relate to systems, methods, non-transitory computer-readable media, and apparatuses for receiving, by a server from a client, a first message comprising a Terminal Identifier (TID) identifying a terminal associated with the client and a counter, providing, by the server to a host, the TID and the counter, receiving, by the server from the host, an External Pre-Shared Key (EPKS) package comprising a transaction key, wherein the transaction key is derived by the host using the TID and the counter, determining, by the server, a session key using the EPKS package, and communicating by the server with the client via a communication session using the session key.

The arrangements disclosed herein relate to systems, methods, non-transitory computer-readable media, and apparatuses for receiving, by a client from a terminal, an External Pre-Shared Key (EPKS) package comprising a transaction key TK, wherein the transaction key is derived by the terminal using an Initial Key (IK) and a counter, sending, by the client to a server, a first message comprising the TID and the counter, receiving, by the client from the server, a second message in response to the first message, determining, by the client, a session key using the EPKS package, and communicating by the client with the server via a communication session using the session key.

These and other features, together with the organization and manner of operation thereof, will become apparent from the following detailed description when taken in conjunction with the accompanying drawings.

DETAILED DESCRIPTION

The arrangements described herein implements Derived Unique Key Per Transaction (DUKPT) scheme to provide a Pre-Shared Key (PSK) to any Internet Engineering Task Force (IETF) protocol such as Transport Layer Security (TLS), Extensible Authentication Protocol (EAP), Internet Key Exchange (IKE), Datagram Transport Layer Security (DTLS), Cryptographic Message Syntax (CMS), and so on. DUKPT is an X9 key management standard designed for Personal Identification Number (PIN) encryption at Point-Of-Sale (POS) terminals. Although ANSI X9.24-3 is the current DUKPT implementation, DUKPT was originally codified in 1998 in the original X9.24 standard. All DUKPT keys are symmetric algorithms that are sufficiently strong and thus can be quantum-resistant. DUKPT enables a host to drive a large number of terminals keys using a single Base Derivation Key (BDK) and at the same time complying with the requirement for unique keys per terminal. DUKPT is available in all payment systems, payment devices, and payment Hardware Security Modules (HSM). PSK was introduced in RFC 4279 applicable to TLS 1.0 defined in RFC 2246 and all subsequent versions including TLS 1.1, TLS 1.2, and currently TLS 1.3, as defined in RFC 8446. PSK is mandatory in TLS 1.3 with guidance provided in RFC 9257 and importing rules in RFC 9258.

Figure 1:
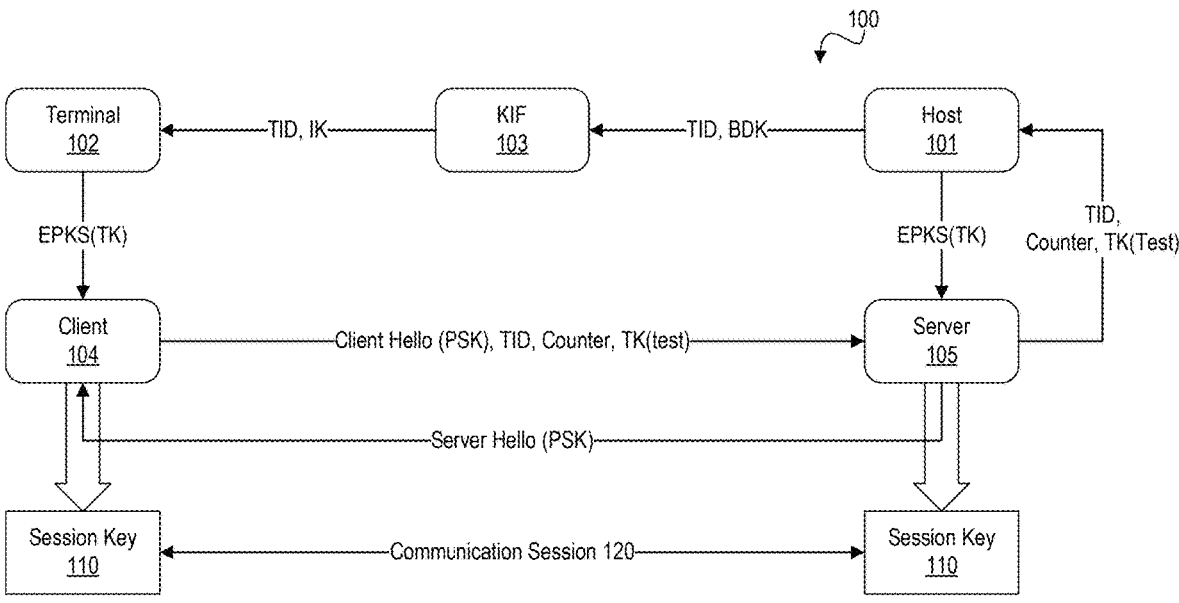
FIG. 1 is a block diagram of a system for generating cryptographic keys for a communication session between a client and a server, according to some arrangements.

FIG. 1 is a block diagram of a system 100 for generating cryptographic keys for a communication session 120 between a client 104 and a server 105, according to some arrangements. The system 100 includes at least a host 101, a terminal 102, a Key Injection Facility (KIF) 103, a client 104, and a server 105. In some examples, each of the host 101, the terminal 102, the KIF 250, the client 104, and the server 105 includes functions, software, or firmware running on a computing system having processing, storage, and networking capabilities for generating, deriving, communicating, and/or verifying keys used for the communication session 120.

In some examples, the host 101 can be functions, software, firmware, and so on running on a computing system of the server 105, or the host 101 can be a Hardware Security Module (HSM) coupled or connected to a computing system of the server 105 (e.g., a computing system). In some examples, the terminal 102 can be functions, software, firmware, and so on running on client 104, or the terminal 102 can be an HSM coupled or connected to the client 104 (e.g., a computing system). In some arrangements, the communication session 120 is a session that uses the IETF protocol. Examples of the IETF protocol include TLS, EAP, IKE, DTLS, CMS, and so on. In the examples in which the communication session 120 is an TLS session, the client 104 includes a client 104, and the server 105 includes a server 105.

In some examples, communications (e.g., transmissions and receptions, shown as arrows in FIG. 1) among the host 101, the terminal 102, the KIF 250, the client 104, and the server 105 can be performed over a network. The network can be any suitable Local Area Network (LAN), Wide Area Network (WAN), or a combination thereof. For example, the network can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network is structured to permit the exchange of data, values, instructions, messages, and the like.

The host 101 can provide or share (e.g., send) a DBK and a Terminal Identifier (TID) to the KIF 250. The DBK can include any suitable cryptographic key of the host 101 (e.g., generated by or stored in the host 101). The TID can be any suitable ID such as a serial number or a globally unique identifier (GUID) that uniquely identifies the terminal 102.

The KIF 250 derives an Initial Key (IK) using the BDK and TID. For example, the KIF 250 generate the IK using a first function (F1), by inputting the TID and the BDK into the first function, which outputs the IK. In some examples, the first function includes a Key Derivation Function (KDF). The KIF 250 provides (e.g., sends or injects) the TID and the IK to the terminal 102. For example, the KIF 250 injects the IK identified using the TID into the terminal 102. The IK is a symmetric algorithm that is sufficiently strong and thus can be quantum-resistant.

The terminal 102 maintains a counter N. Each time a session key 110 is derived in the system 100 or each time a communication session 120 is established with the server 105, the counter is increased by 1 (e.g., N+1). The terminal 102 derives a Transaction Key (TK) using the IK and a counter. For example, the terminal 102 can run IK through a second function (F2) a number of times as indicated by the counter. In the examples in which the counter is N, the IK is run through the second function a first time to determine a DK, which is run through the second function a second time to determine an updated DK, until the DK from the iteration N−1 is run through the second function the Nth time to determine the final DK. The final DK is run through a third function (F3) to generate the TK. After the terminal 102 generates the TK, the terminal 102 erases the IK and the DKs after deriving the TK.

In some examples, each of the first function, the second function, and the third function can be a different function. In some examples, two or more of the first function, the second function, and the third function can be a same function. In some examples, each of the first function, the second function, and the third function can include a hash algorithm or a one-way function.

The terminal 102 provides (e.g., sends) the TK to a client 104 as an External PKS (EPKS) package, e.g., EPKS(TK). The EPSK is a PSK that is established or provisioned out of band (e.g., outside of the communication session 120) that is a tuple of one or more of a base key, an external identity, or a hash. The base key is a secret value of an EPSK. The external identity is a sequence of bytes used to identify an EPSK.

The client 104 sends a first message (e.g., a client "hello" message) to initiate a handshake with the server 105. The first message includes a PSK option (e.g., an indicator corresponding to or indicating PSK) and information. The information includes the TID, a counter, and a ciphertext TK(test) for verification. The ciphertext TK(text) is generated by the client 104 by encrypting plaintext (text) using the TK.

The server 105 provides (e.g., sends) the information such as the TID, the counter, and TK(test) to the host 101. The host 101 can derive the TK using the BDK, the received TID, and the received counter. For example, the host 101 can generate the IK using the first function (F1), by inputting the TID and the BDK into the first function, which outputs the IK. IK is then run through a second function (F2) a number of times as indicated by the counter. In the examples in which the counter is N, the IK is run through the second function a first time to determine a DK, which is run through the second function a second time to determine an updated DK, until the DK from the iteration N−1 is run through the second function the Nth time to determine the final DK. The final DK is run through a third function (F3) to generate the TK. After the host 101 generates the TK, the host 101 erases the IK and the DKs after deriving the TK.

In some examples, the host 101 can verify TK(text) by using the derived TK to attempt to decrypt TK(text), if decryption is successful, and the obtained plaintext (text) is a text that is pre-established between the host 101 and the terminal 102, then the host 101 can verify that the TK is correctly derived. In response, the host 101 can return (e.g., sends) the EPKS package with the TK (e.g., the EPKS(TK)) to the server 105.

The server 105 returns (e.g., sends) a second message (e.g., a server "hello" message to the client 104. The second message includes a PSK option (e.g., an indicator corresponding to or indicating PSK). Both the client 104 and the server 105 use the EPKS(TK) to derive the session keys 110 to establish the communication session 120. The communication session 120 can be via or can use a protocol (e.g., IETF) that is designed to prevent activities such as eaves-dropping, tempering, and message forgery.

The use of a previously established PSK allows nodes (e.g., the client 104 and the server 105) to authenticate the endpoint identities and provides resistance to attacks in the presence of quantum computers. In PSK authentication security, each PSK is known to exactly one client 104 and one server 105, and the client 104 and the server 105 never switch roles. In some examples, PSKs can be integrated into the protocol (e.g., TLS 1.3) of the communication session 120, for example, for session initiation and session resumption.

The protocol for the communication session 120 can support PSK authentication, in which PSKs can be established via session tickets from prior connections (e.g., the establishment of the communication session 120) or via some external, out-of-band mechanism. The protocol can require that each PSK only be used with a single hash function, to simplify protocol analysis. In other examples, a PSK can be used with any hash algorithm and a Pseudo-random Function (PRF).

In some examples, a PSK importer interface allows EPSKs to be imported and subsequently bound to a specific KDF and hash function for use in the protocol for the communication session 120 (e.g., TLS 1.3 and DTLS 1.3). PSKs can be derived from EPSKs by including the target KDF, a protocol version, and an optional context string to ensure uniqueness. This process yields a set of candidate PSKs, each of which are bound to a target KDF and protocol, that are separate from those used in the protocol of the communication session 120. This expands what would normally have been a single PSK and identity into a set of PSKs and identities.

In the Key Exchange phase in the TLS protocol, the client 104 sends the first message (Client Hello), which contains PSKs offered by the client 104. The server 105 processes the first message and determines the appropriate cryptographic PSK parameters for the communication session 120. The server 105 then responds with its own response (e.g., the second message, Server Hello), which contains a "pre-_shared_key" extension indicating which of the client's offered PSKs was selected. The combination of the first and second messages determines the shared keys. In some examples, the Client Hello message (the first message) contains the TID, the counter, and an encrypted "test" as PSK parameters. The server 105 recognizes the PSK type from the client 104 and sends the PSK parameters to the host 101.

In some examples, the PSK importer interface can mirror an interface of the communication session 120 (e.g., a TLS exporter interface). The PSK interface diversifies a key based on some contextual information. Different from an exporter interface for which output uniqueness is achieved through an explicit label and context string, the PSK importer interface takes an EPSK (e.g., the EPSK(TK)) and identity (e.g., TID or another suitable identity) and "imports" it into the communication session 120 to create a set of "derived" PSKs and identities that are unique. Each derived PSK is bound to a target protocol of the communication session 120, KDF identifier identifying a KDF, and optional context string. The resulting PSK binder keys are modified with a new derivation label to prevent confusion with non-imported PSKs. Through the PSK importer interface, importing EPSKs with different identities yields distinct PSK binder keys.

In other words, the PSK importer interface takes an EPSK with an external identity and a base key along with an optional context as inputs and transforms the inputs into a set of PSKs and imported identities for use in a connection based on target protocols and KDFs of the communication session 120. To prevent confusion between imported and non-imported PSKs, imported PSKs change the PSK binder key derivation label. In the examples in which the client 104 or the server 105 deprecate a hash function and no longer use it for the communication session 120, the corresponding KDF is removed from the set of target KDFs used for importing keys. This does not affect the KDF operation used to derive imported PSKs.

As shown in FIG. 1, the terminal 102 obtains the IK from the KIF 103, and the terminal 102 never obtains or receives the BDK. The client 104 obtains the TKs from the terminal 102 such that the terminal 102 performs the process to determine the TKs. The client 104 interfaces to the terminal 102 via EPKS. For example, the client 104 can be integrated with the terminal 102, or the client 104 and the terminal 102 are separate applications or devices without modifying the TLS client process at the client 104. The host 101 can support thousands of terminals such as the terminal 102 using the same BDK, minimizing the complexity of symmetric key management. That is, the host 101 can use the same BDK in the process shown in FIG. 1 for multiple terminals 102. Given that each TID is unique to a given terminal 102, the IK is likewise unique per terminal 102. The multiple terminals 102 can be located at a same physical location (e.g., a same office, a same building) or for a same enterprise.

Given that the system 100 can generate sessions keys 110 and the TK that are symmetrical keys of sufficient strength, the system 100 provides a quantum-resistant key management method. The existing IETF protocol does not need to be modified to accommodate the arrangements, disclosed herein, thus making the system 100 backward compatible with minimal implementation cost to comply with requirements in PQC transitions.

A symmetric key refers to a cryptographic key that is identical for the sender and receiver (e.g., the client 104 and the server 105) of a data transmission. The sender encrypts the data or generates a Message Authentication Code (MAC) or Hash-based Message Authentication Code (HMAC) for integrity and authentication. Both the sender and receiver must have the same key (e.g., the symmetric key) for the data to be transmitted to the receiver such that the receiver can either decipher the encrypted data, encrypted by the sender, or verify a HMAC or a MAC, generated by the sender.

The data communicated between the client 104 and the server 105 via the communication session 120 can be any type of information that needs protection during transmission. Examples of such data can include emails, messages, virtual machine application data, banking client data, data communicated using the internet or web browser, etc.

Figure 2:
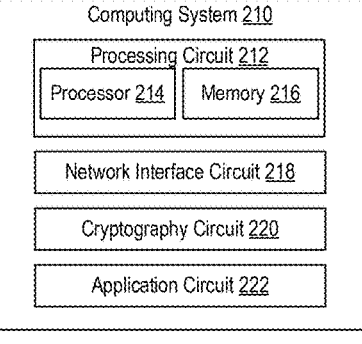
FIG. 2 is a block diagram of an example of computing systems and a Key Injection Function (KIF), according to some arrangements.
Figure 2:
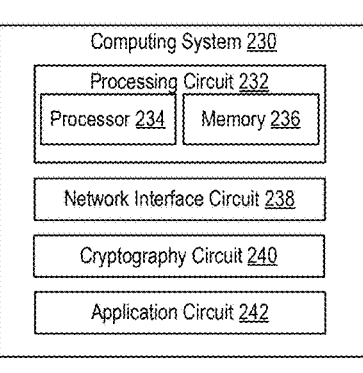
Figure 2:
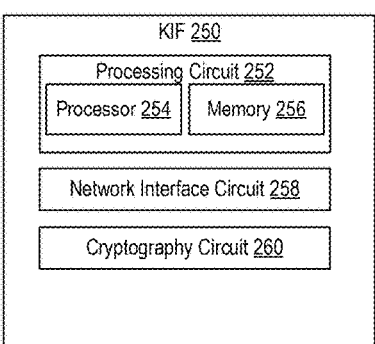

FIG. 2 is a block diagram of an example of a computing system 210, a computing system 230, and the KIF 250, according to some arrangements. Referring to FIGS. 1-2, the functions described herein of at least one of the host 101 or the server 105 is performed using the computing system 210. In some examples, the functions of both the host 101 and the server 105 are performed using the same computing system 210. In some examples, the functions of both the host 101 and the server 105 are performed using two separate computing systems 210 that are connected using a local physical connection. The functions described herein of at least one of the terminal 102 or the client 104 is performed using the computing system 230. In some examples, the functions of both the terminal 102 and the client 104 are performed using the same computing system 230. In some examples, the functions of both the terminal 102 and the client 104 are performed using two separate computing systems 230 that are connected using a local physical connection.

The computing system 210 is shown to include various circuits and logic for implementing the operations described herein. The computing system 210 includes one or more of a processing circuit 212, a network interface circuit 218, a cryptography circuit 220, and an application circuit 222. While various circuits, interfaces, and logic with particular functionality are shown, it should be understood that the computing system 210 includes any number of circuits, interfaces, and logic for facilitating the operations described herein. For example, the activities of multiple circuits are combined as a single circuit and implemented on a same processing circuit (e.g., the processing circuit 212), as additional circuits with additional functionality are included.

In some arrangements, the processing circuit 212 includes a processor 214 and a memory 216. The processor 214 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 216 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 216 is or includes tangible, non-transient volatile memory or non-volatile memory. Accordingly, the memory 216 includes database components, object code components, script components, or any other type of information structure for supporting the various activities and information structures described herein. The processing circuit 212 can be used to implemented one or more of the circuits 218, 220, and 222.

The network interface circuit 218 is configured for and structured to establish a connection and communicate with the computing system 230 and/or the KIF 250 via the network described herein or another a suitable wired, wireless, or physical connection. The network interface circuit

218 is structured for sending and receiving data over a communication network (e.g., the network over which the communication session 120 is established) or a physical connection (e.g., via a physical connector such as Universal Serial Bus (USB)). Accordingly, the network interface circuit 218 includes any of a cellular transceiver (for cellular standards), wireless network transceiver (for 802.11X, Zig-Bee, Bluetooth, Wi-Fi, or the like), wired network interface, or a combination thereof. For example, the network interface circuit 218 may include wireless or wired network modems, ports, baseband processors, and associated software and firmware.

The application circuit 222 can be used to execute one or more client-side applications or software on the computing system 210 for which the communication session 120 needs to be established with the server 105. For example, the application circuit 222 can execute an email client, a mobile banking application, a browser, a word processing application, a mobile banking application, a mobile wallet, a File Transfer Protocol (FTP) client, a virtual machine application, and so on.

The cryptography circuit 220 is executed by the processing circuit 212 in some arrangements. The cryptography circuit 220 performs cryptographic operations of or embodies the at least one of the host 101 or the server 105, such as deriving the TK, verifying TK(test), determining the session key 110 using the TK, and using the session key in the communication session 120, in the manner described. The computing system 210 can provide the cryptography circuit 220 in various manners. In some arrangements, the cryptography circuit 220 is a server-based application executable on the computing system 210. In this regard, the user of the computing system 210 has to download the cryptography circuit 220 from an application download server prior to usage. In some arrangements, the cryptography circuit 220 is a web-based interface application provided by an application server. In some arrangements, the cryptography circuit 220 includes an API and/or an SDK provided by the application server that facilitates integration with other applications. In some arrangements, the cryptography circuit 220 is coded into the memory 216 of the computing system 210. All such variations and combinations are intended to fall within the spirit and scope of the present disclosure.

The computing system 230 is shown to include various circuits and logic for implementing the operations described herein. More particularly, the computing system 230 includes one or more of a processing circuit 232, a network interface circuit 238, a cryptography circuit 240, and an application circuit 242. While various circuits, interfaces, and logic with particular functionality are shown, it should be understood that the computing system 230 includes any number of circuits, interfaces, and logic for facilitating the operations described herein. For example, the activities of multiple circuits are combined as a single circuit and implemented on a same processing circuit (e.g., the processing circuit 232), as additional circuits with additional functionality are included.

In some arrangements, the processing circuit 232 has a processor 234 and memory 236. The processor 234 is a processing component such as the processor 214. The memory 236 is a memory device such as the memory 216. The processing circuit 232 can be used to implemented one or more of the circuits 238, 240, and 242.

The network interface circuit 238 is a network device such as the network interface circuit 218. The network interface circuit 238 is configured for and structured to establish a connection and communicate with the computing system 210 and/or the KIF 250 via the network described herein or another a suitable wired, wireless, or physical connection.

The application circuit 242 can be used to execute one or more server-side applications or software on the computing system 230 for which the communication session 120 needs to be established with the client 104. For example, the application circuit 242 can execute an email server, a mobile banking application server, a website, a word processing application server, a mobile banking application server, a mobile wallet server, an FTP server, a virtual machine server, and so on.

The cryptography circuit 240 is executed by the processing circuit 232 in some arrangements. In some arrangements, the cryptography circuit 240 can perform cryptographic operations of or embodies the at least one of the terminal 102 or the client 104, such as deriving the TK, generating TK(test), determining the session key 110 using the TK, and using the session key in the communication session 120, in the manner described. The computing system 230 can provide the cryptography circuit 240 in various manners. In some arrangements, the cryptography circuit 240 is a server-based application executable on the computing system 230. In this regard, the user of the computing system 230 has to download the cryptography circuit 240 from an application download server prior to usage. In some arrangements, the cryptography circuit 240 is a web-based interface application provided by an application server. In some arrangements, the cryptography circuit 240 includes an API and/or an SDK provided by the application server that facilitates integration with other applications. In some arrangements, the cryptography circuit 240 is coded into the memory 236 of the computing system 230. All such variations and combinations are intended to fall within the spirit and scope of the present disclosure.

The KIF 250 is shown to include various circuits and logic for implementing operations described herein. More particularly, the KIF 250 includes one or more of a processing circuit 252, a network interface 258, and a cryptography circuit 260. While various circuits, interfaces, and logic with particular functionality are shown, it should be understood that the KIF 250 includes any number of circuits, interfaces, and logic for facilitating the operations described herein. For example, the activities of multiple circuits are combined as a single circuit and implemented on a same processing circuit (e.g., the processing circuit 252), as additional circuits with additional functionality are included.

In some arrangements, the processing circuit 252 has a processor 254 and memory 256. The processor 254 is a processing component such as the processor 214. The memory 256 is a memory device such as the memory 216. The processing circuit 252 can be used to implemented one or more of the circuits 258 and 260.

The network interface circuit 258 is a network device such as the network interface circuit 218. The network interface circuit 258 is configured for and structured to establish a connection and communicate with the computing system 210 and/or the computing system 230 via the network described herein or another suitable wired, wireless, or physical connection.

The cryptography circuit 260 is executed by the processing circuit 252 in some arrangements. The cryptography circuit 260 can generate an IK, in the manner described.

Figure 3:
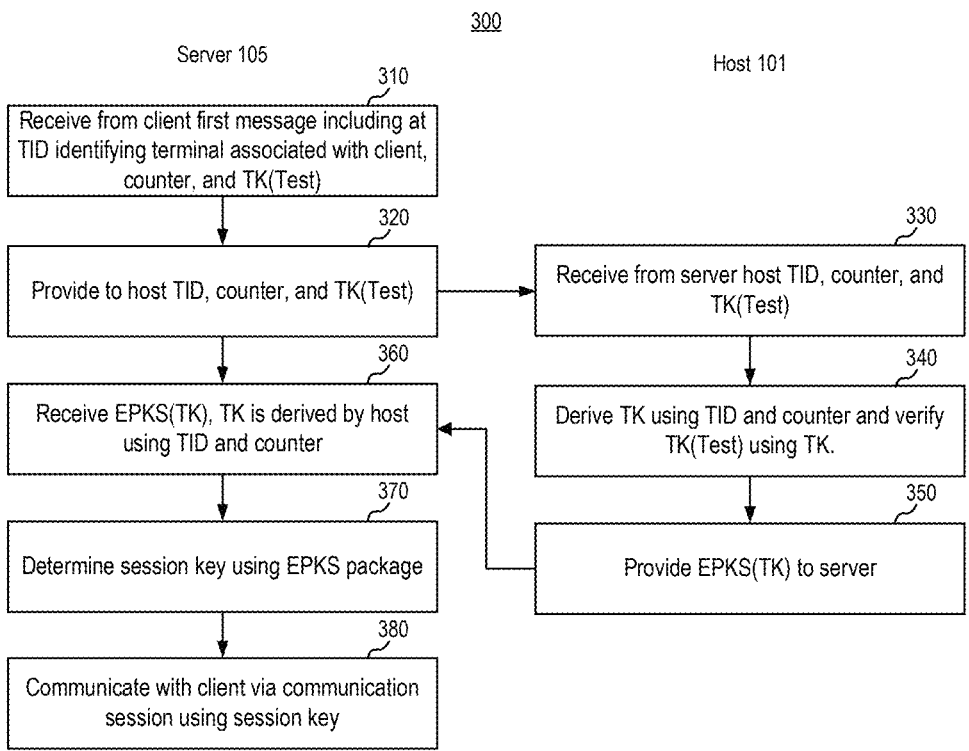
FIG. 3 is a flow diagram illustrating a server method for generating session keys, according to various arrangements.

FIG. 3 is a flow diagram illustrating a method 300 for generating session keys 110, according to various arrangements. The method 300 can be performed by the server 105 and the host 101. Communication between the host 101 and the server 105 can be performed using a network or a physical connection in the examples in which the host 101 and the server 105 are implemented using different computing systems 210 or via APIs between the host 101 and server 105 in the examples in which the host 101 and the server 105 are functions, software, firmware, and so on running on the same computing system 210.

At 310, the server 105 receives from the client 104 via a network a first message including the TID identifying the terminal 102 associated with the client 104, the counter, and TK(test). At 320, the server 105 provides to the host 101 the TID, the counter, and TK(test). At 330, the host 101 receives the TID, the counter, and TK(test) from the server 105. TK(test) is a ciphertext is generated by the client 104 by encrypting plaintext (test) using TK.

At 340, the host 101 derives the TK using the TID and the counter 340, and verifies TK(Test) using TK in the manner described. The host 101 verifies the TK derived by the host 101 in response to successfully decrypting TK(test) using the TK derived by the host 101. At 350, the host 101 provides the server 105 the EPKS(TK).

At 360, the server 105 receives from the host 101 the EPKS(TK) including the TK. At 370, the server derives the session key 110 using the EPKS(TK). In some examples, the first message includes a first indicator indicating PSK. The server 105 sends a second message to the client 104 in response to receiving the EPKS(TK). The second message includes a second indicator indicating the PSK. At 380, the server 105 communicates with the client 104 via the communication session using the session key 110.

Figure 4:
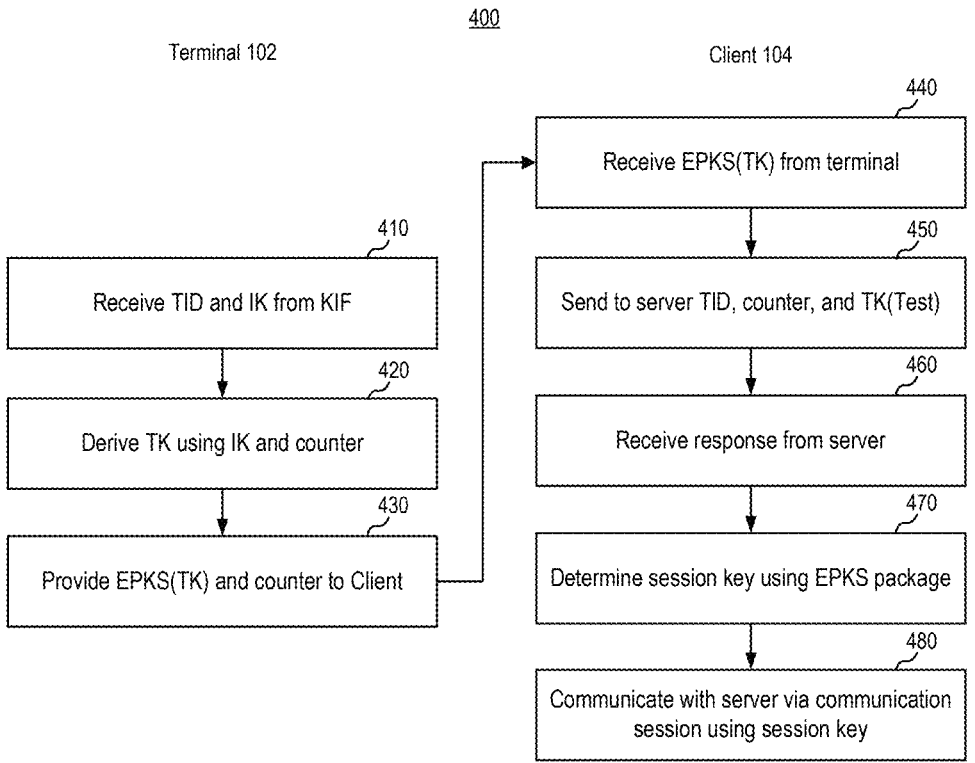
FIG. 4 is a flow diagram illustrating a client method for generating session keys, according to various arrangements.

FIG. 4 is a flow diagram illustrating a method 400 for generating session keys 110, according to various arrangements. The method 400 can be performed by the terminal 102 and the client 104. Communication between the terminal 102 and the client 104 can be performed using a network or a physical connection in the examples in which the terminal 102 and the client 104 are implemented using different computing systems 230 or via APIs between the terminal 102 and the client 104 in the examples in which the terminal 102 and the client 104 are functions, software, firmware, and so on running on the same computing system 230.

At 410, the terminal 102 receives the TID and the IK from the KIF 103. At 420, the terminal 102 derives the TK using the IK and the counter. The counter is maintained by the terminal 102. At 430, the terminal 102 provides the EPKS (TK) and the counter to the client 104. At 440, the client 104 receives from the terminal 102 the EPKS(TK) including the TK and the counter. In some examples, the client 104 generates TK(test) by encrypting plaintext (text) using TL. In other examples, the client 104 can generate TK(Test) and pass TK(test) to the client 104, which forwards TK(test) to the server 105 in the manner described.

At 450, the client 104 sends to the server 105 (e.g., via a network) a first message including the TID, the counter, and TK(test). At 460, the client 104 receives from the server 105 response such as the second message in response to the first message. In some examples, the first message includes a first indicator indicating PSK. In some examples, the second message includes a second indicator indicating the PSK. At 470, the client determines a session key 110 using the EPKS package. At 480, the client 104 communicates with the server 105 via a communication session 120 using the session key 110.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   receiving, by a server from a client, a first message comprising a Terminal Identifier (TID) identifying a terminal associated with the client and a counter;
   providing, by the server to a host, the TID and the counter;
   receiving, by the server from the host, an External Pre-Shared Key (EPKS) package comprising a transaction key, wherein the transaction key is derived by the host using the TID and the counter;
   determining, by the server, a session key using the EPKS package; and
   communicating by the server with the client via a communication session using the session key, wherein the host provides the TID and a Base Derivation Key (BDK) to a Key Injection Facility (KIF), and the KIF derives an Initial Key (IK) using the BDK.

2. The method of claim 1, wherein the communication session is using an Internet Engineering Task Force (IETF) protocol.

3. The method of claim 2, wherein the IETF protocol comprises at least one of Transport Layer Security (TLS), Extensible Authentication Protocol (EAP), Internet Key Exchange (IKE), Datagram Transport Layer Security (DTLS), or Cryptographic Message Syntax (CMS).

4. The method of claim 1, wherein the KIF provides the TID and Initial Key (IK) to the terminal.

5. A method, comprising:
   receiving, by a server from a client, a first message comprising a Terminal Identifier (TID) identifying a terminal associated with the client and a counter;
   providing, by the server to a host, the TID and the counter;
   receiving, by the server from the host, an External Pre-Shared Key (EPKS) package comprising a transaction key, wherein the transaction key is derived by the host using the TID and the counter;

determining, by the server, a session key using the EPKS package; and communicating by the server with the client via a communication session using the session key receiving, by the server from the client, a ciphertext TK (test), wherein the ciphertext TK (test) is generated by the client or the terminal by encrypting a plaintext test using the transaction key (TK); and providing, by the server, the ciphertext to the host, wherein the host verifies the transaction key derived by the host in response to successfully decrypting the ciphertext using the transaction key derived by the host.

6. A method, comprising:

receiving, by a server from a client, a first message comprising a Terminal Identifier TID) identifying a terminal associated with the client and a counter;

providing, by the server to a host, the TID and the counter;

receiving, by the server from the host, an External Pre-Shared Key (EPKS) package comprising a transaction key, wherein the transaction key is derived by the host using the TID and the counter;

determining, by the server, a session key using the EPKS package; and communicating by the server with the client via a communication session using the session key, wherein the first message comprises a first indicator indicating Pre-Shared Key (PSK); and the method further comprises sending, by the server to the client, a second indicator indicating the PSK.

7. A method, comprising:

receiving, by a client from a terminal, an External Pre-Shared Key (EPKS) package comprising a transaction key TK, wherein the transaction key is derived by the terminal using an Initial Key (IK) and a counter;

sending, by the client to a server, a first message comprising the TID and the counter;

receiving, by the client from the server, a second message in response to the first message;

determining, by the client, a session key using the EPKS package; and communicating by the client with the server via a communication session using the session key, wherein the host provides the TID and a Base Derivation Key (BDK) to a Key Injection Facility (KIF), and the KIF derives an Initial Key (IK) using the BDK.

8. The method of claim 7, wherein the communication session is using an Internet Engineering Task Force (IETF) protocol.

9. The method of claim 8, wherein the IETF protocol comprises at least one of Transport Layer Security (TLS), Extensible Authentication Protocol (EAP), Internet Key Exchange (IKE), Datagram Transport Layer Security (DTLS), or Cryptographic Message Syntax (CMS).

10. The method of claim 7, wherein the KIF provides the IK to the terminal which uses the IK to derive the TK and provides the TK to the client in the EPKS package, and the client never receives the IK.

11. The method of claim 7, wherein communicating by the server with the client via a communication session using the session key comprises generating and verifying, using the session key, a Hash-based Message Authentication Code (HMAC) or a Message Authentication Code (MAC).

12. A method, comprising:

receiving, by a client from a terminal, an External Pre-Shared Key (EPKS) package comprising a transaction key TK, wherein the transaction key is derived by the terminal using an Initial Key (IK) and a counter;

sending, by the client to a server, a first message comprising the TID and the counter;

receiving, by the client from the server, a second message in response to the first message;

determining, by the client, a session key using the EPKS package; and communicating by the client with the server via a communication session using the session key generating, by the client, a ciphertext TK (test) by encrypting a plaintext test using the transaction key TK;

providing, by the client to the server, the ciphertext TK (test), wherein the server provides the ciphertext TK (test) to the host, and the host verifies the transaction key TK derived by the host in response to successfully decrypting the ciphertext TK (test) using the transaction key TK derived by the host.

13. A method, comprising:

receiving, by a client from a terminal, an External Pre-Shared Key (EPKS) package comprising a transaction key TK, wherein the transaction key is derived by the terminal using an Initial Key (IK) and a counter;

sending, by the client to a server, a first message comprising the TID and the counter;

receiving, by the client from the server, a second message in response to the first message;

determining, by the client, a session key using the EPKS package; and communicating by the client with the server via a communication session using the session key, wherein the first message comprises a first indicator indicating Pre-Shared Key (PSK); and the method further comprises sending, by the server to the client, a second indicator indicating the PSK.

14. At least one non-transitory processor-readable medium comprising processor-readable instructions, such that, when executed in one or more processors of a client, causes the one or more processors to:

receive, from a terminal, an External Pre-Shared Key (EPKS) package comprising a transaction key, wherein the transaction key is derived by the terminal using an Initial Key (IK) and a counter;

send, to a server, a first message comprising the TID and the counter;

receive, from the server, a second message in response to the first message;

determine a session key using the EPKS package; and communicate with the server via a communication session using the session key, wherein the host provides the TID and a Base Derivation Key (BDK) to a Key Injection Facility (KIF), and the KIF derives an Initial Key (IK) using the BDK.

15. The non-transitory processor-readable medium of claim 14, wherein the communication session uses an Internet Engineering Task Force (IETF) protocol.

16. The non-transitory processor-readable medium of claim 14, wherein the one or more processors is further configured to generate a ciphertext by encrypting a plaintext using the transaction key, wherein the first message further comprises the ciphertext, wherein the server provides the ciphertext to the host, and the host verifies a transaction key derived by the host in response to successfully decrypting the ciphertext using the transaction key derived by the host.

17. The non-transitory processor-readable medium of claim 14, wherein the KIF provides the IK to the terminal.

\* \* \* \* \*